(12) United States Patent
Yang

(10) Patent No.: US 12,508,362 B2
(45) Date of Patent: Dec. 30, 2025

(54) INFUSION NEEDLE STRUCTURE OF DRUG INFUSION DEVICE

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 568 days.

(21) Appl. No.: 18/022,756

(22) PCT Filed: Oct. 30, 2020

(86) PCT No.: PCT/CN2020/125031
§ 371 (c)(1),
(2) Date: Feb. 23, 2023

(87) PCT Pub. No.: WO2022/052248
PCT Pub. Date: Mar. 17, 2022

(65) Prior Publication Data
US 2023/0310740 A1    Oct. 5, 2023

(30) Foreign Application Priority Data

Sep. 8, 2020   (WO) ................ PCT/CN2020/113980

(51) Int. Cl.
*A61M 5/158* (2006.01)
*A61M 5/14* (2006.01)
(Continued)

(52) U.S. Cl.
CPC .............. *A61M 5/158* (2013.01); *A61M 5/36* (2013.01); *A61M 2005/1402* (2013.01);
(Continued)

(58) Field of Classification Search
CPC .... A61M 5/158; A61M 5/36; A61M 5/14244; A61M 5/14248; A61M 2005/1405;
(Continued)

(56) References Cited

U.S. PATENT DOCUMENTS

| | | |
|---|---|---|
| 2003/0236498 A1 | 12/2003 | Gross et al. |
| 2007/0049865 A1 | 3/2007 | Radmer et al. |
| | (Continued) | |

FOREIGN PATENT DOCUMENTS

| | | |
|---|---|---|
| CN | 1863564 | 11/2006 |
| CN | 106110445 | 11/2016 |
| | (Continued) | |

OTHER PUBLICATIONS

"International Search Report (Form PCT/ISA/210) of PCT/CN2020/125031," mailed on May 27, 2021, pp. 1-2.

*Primary Examiner* — Cris L. Rodriguez
(74) *Attorney, Agent, or Firm* — JCIP GLOBAL INC.

(57) ABSTRACT

An infusion needle structure of drug infusion device includes: an infusion needle including a front end and a back end; a needle holder provided with at least one auxiliary fastener; one fastening portion, arranged inside the infusion device, cooperates with the auxiliary fastener to lock the needle holder in the working position; an unlock hole provided on the needle holder or on the housing of the infusion device; and an unlock rod that is inserted into the unlock hole and pushed, thus releasing and resetting the needle holder. The infusion needle is able to reset and released when the infusion device is during replacement.

12 Claims, 3 Drawing Sheets

(51) Int. Cl.
  *A61M 5/162* (2006.01)
  *A61M 5/36* (2006.01)
  *A61M 5/142* (2006.01)
(52) U.S. Cl.
  CPC ..... *A61M 5/14244* (2013.01); *A61M 5/14248* (2013.01); *A61M 2005/14252* (2013.01); *A61M 2005/1581* (2013.01); *A61M 2005/1585* (2013.01); *A61M 2005/1623* (2013.01)
(58) Field of Classification Search
  CPC ........... A61M 2005/14252; A61M 2005/1581; A61M 2005/1585; A61M 2005/1623; A61M 2005/2073
  See application file for complete search history.

(56) References Cited

U.S. PATENT DOCUMENTS

2010/0152666 A1   6/2010   Carter et al.
2019/0175819 A1*  6/2019   Yang .................. A61M 5/1452

FOREIGN PATENT DOCUMENTS

EP          3598942       1/2020
WO          2020068623    4/2020

* cited by examiner

INFUSION NEEDLE STRUCTURE OF DRUG INFUSION DEVICE

CROSS-REFERENCE TO RELATED APPLICATION

This application is a 371 of international application of PCT application serial no. PCT/CN2020/125031, filed on Oct. 30, 2020, which claims the priority benefit of PCT application no. PCT/CN2020/113980, filed on Sep. 8, 2020. The entirety of each of the above-mentioned patent applications is hereby incorporated by reference herein and made a part of this specification.

TECHNICAL FIELD

The present invention mainly relates to the field of medical instruments, in particular to an infusion needle structure of a drug infusion device.

BACKGROUND

A drug infusion device can continuously deliver drug into a patient's body for disease treatment. Drug infusion devices are widely used in the field of diabetes treatment, which continuously infuse required dosage of insulin into the patient's subcutaneous tissue, thereby simulating the secretion function of the pancreas to keep the blood glucose stable. The drug fluid is usually stored inside the infusion pump. The existing drug infusion device, controlled by remote device, is usually attached directly on the patient's skin through a medical adhesive tape.

At present, the drug infusion device in prior arts needs to be replaced with a new infusion device after the drug is exhausted. However, a part of the infusion needle is still under the skin during the process of tearing it off from the skin. This part of the infusion needle is easy to accidentally bring the skin trauma, aggravating the user's pain, and increasing the user's chance of skin infection.

Therefore, in the prior art, there is an urgent need for an infusion needle structure of a drug infusion device that can release and reset the infusion needle when the infusion device is during replacement.

BRIEF SUMMARY OF THE INVENTION

The embodiment of the invention discloses an infusion needle structure of a drug infusion device. When the infusion device is replaced, using the unlock rod and the unlock hole, the user releases and resets the needle holder arranged in the middle position of the infusion device prior to tear the tape pasted on the skin surface, thereby removing the subcutaneous end of the infusion needle from the skin, and avoiding the skin trauma caused by the exposed portion of the infusion needle during the replacement, which enhances the user experience.

The invention discloses an infusion needle structure of a drug infusion device, which comprises: an infusion needle including a front end and a back end; a needle holder provided with at least one auxiliary fastener, the infusion needle is arranged on the needle holder, when the needle holder is in the working position, the back end is pierced into the skin while the front end is connected with the drug storage unit; one fastening portion, arranged inside the infusion device, cooperates with the auxiliary fastener to lock the needle holder in the working position; an unlock hole provided on the needle holder or on the housing of the infusion device; and an unlock rod that can be inserted into the unlock hole and pushed, thus releasing and resetting the needle holder.

According to one aspect of the present invention, the needle holder includes a guide post which can move along a guide chamber that is provided in the housing.

According to one aspect of the present invention, the auxiliary fastener is arranged on the guide post or under the top of the needle holder, and the auxiliary fastener or the fastening portion includes a fastening hole, a fastening block, a fastening slot, or a fastening hook.

According to one aspect of the present invention, the mode for forcing to release and reset the needle holder includes a pop-up mode or a pushing mode.

According to one aspect of the present invention, it further includes a spring, arranged in the guide chamber, which is compressed by the needle holder when the needle holder is in the working position.

According to one aspect of the present invention, the fastening portion and the auxiliary fastener are fastened with each other directly, when being unlocked, the end of the fastening portion is pushed by the unlock rod to move a certain distance to release the auxiliary fastener fastened by the fastening portion, and the spring exerts a resilient force toward the needle holder.

According to one aspect of the present invention, it further includes a locking lever, the auxiliary fastener is a fastening hole or a fastening slot, the first end of the locking lever is movably arranged inside the auxiliary fastener while the second end is fastened by the fastening portion, the fulcrum of the locking lever is arranged between the two ends of the locking lever, and the second end is pushed by the unlock rod to move a certain distance to release the locking lever and the needle holder.

According to one aspect of the present invention, it further includes a limit component, arranged on the housing, which is used to limit the position of the needle holder when the needle holder is in the non-working position.

According to one aspect of the present invention, the unlock rod is arranged on the limit component.

According to one aspect of the present invention, the side surface of the guide post is provided with convexes or concaves while the limit component is provided with a fastening cantilever which is used to cooperate with the convexes or concaves to limit the position of the needle holder.

According to one aspect of the present invention, the opening of the unlock hole is provided on the top of the needle holder or the housing, or on the side wall of the housing.

According to one aspect of the present invention, the opening of the unlock hole is provided on the top of the needle holder, and the longitudinal directions of the unlock hole and the guide post are parallel to each other.

Compared with the prior art, the technical solution of the present invention has the following advantages:

In the infusion needle structure of the drug infusion device disclosed in the present invention, an unlock hole provided on the needle holder or on the housing of the infusion device; and an unlock rod that can be inserted into the unlock hole and pushed, thus releasing and resetting the needle holder. After the needle holder is released and reset, the subcutaneous end of the infusion needle can be removed out of the skin, avoiding the exposed portion of the infusion needle to hurt the skin while the infusion device is being replaced.

Furthermore, the infusion needle structure further includes a spring, arranged in the guide chamber, which is compressed by the needle holder when the needle holder is in the working position. Once the spring is set, the needle holder can pop-up and be automatically reset after being released, which optimizes the releasing and resetting process and facilitates the user's operation.

Furthermore, the infusion needle structure further includes a locking lever, the auxiliary fastener is a fastening hole or a fastening slot, the first end of the locking lever is movably arranged inside the auxiliary fastener while the second end is fastened by the fastening portion, the fulcrum of the locking lever is arranged between the two ends of the locking lever. The fulcrum is arranged between the two ends, making the movement direction of the two ends opposite. Therefore, while the second end is pushed by the unlock rod, the first end can move to force the needle holder out, which enhances the dexterity of internal structure.

Furthermore, the infusion needle structure further includes a limit component, arranged on the housing, which is used to limit the position of the needle holder when the needle holder is in the non-working position. The limit component can avoid the needle holder falling off from the guide chamber, and prevent the infusion needle from being touched and piercing the skin by mistake.

Furthermore, the opening of the unlock hole is provided on the top of the needle holder, and the longitudinal directions of the unlock hole and the guide post are parallel to each other. The two parallel longitudinal directions make user just only apply a small force to release the needle holder, simplifying the operation.

BRIEF DESCRIPTION OF THE DRAWINGS

FIG. 1b is a schematic view of the infusion needle structure taken along the section line A-A' in FIG. 1a;

DETAILED DESCRIPTION

Figure 1A:
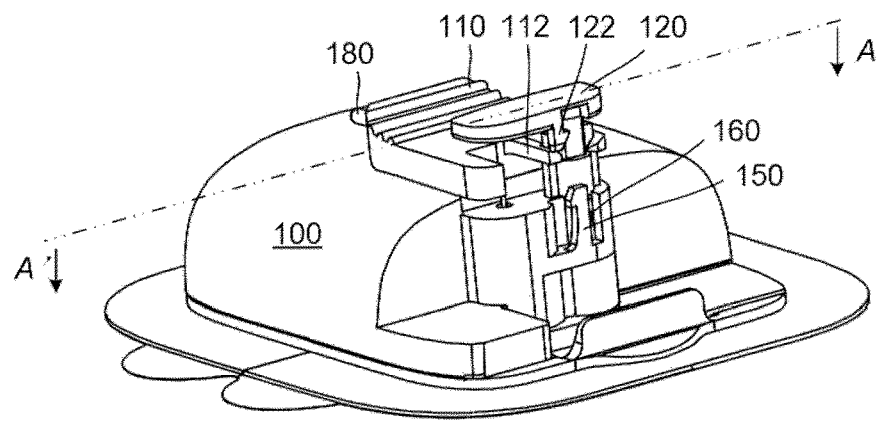
FIG. 1a is a schematic view of a partial structure of the drug infusion device according to an embodiment of the present invention.

As mentioned above, the prior art drug infusion device needs to be torn from the skin surface to replace a new infusion device after the drug is exhausted, but the unretracted infusion needle will hurt the skin during the tearing process, which brings trauma, aggravates the user's pain, and increases the chance of skin infection.

In order to solve this problem, the present invention provides an infusion needle structure of a drug infusion device. Using the unlock rod and the unlock hole, the user can release and reset the needle holder, so that the subcutaneous end of the infusion needle can be removed out of the skin, avoiding the skin trauma during the replacement process, and enhancing the user experience.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, width, length or distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in following description of the drawings.

Figure 1B:
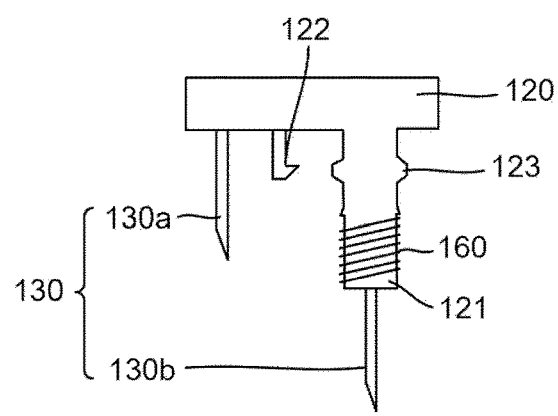

FIG. 1a is a schematic view of a partial of the structure of the drug infusion device according to an embodiment of the present invention. FIG. 1b is a schematic view of the infusion needle structure taken along the section line A-A' in FIG. 1a. The view angle of the structure in FIG. 3b, FIG. 3c, FIG. 4a, or FIG. 4b is the same as it in FIG. 1b, which will not be described again below.

As shown in FIG. 1a, the infusion device of the embodiment of the present invention is a patch-type drug infusion device, that is, the infusion needle is integrated on the infusion device without a long tube.

The infusion device includes a housing 100 where each structure of the infusion unit (such as a driving unit, a drug storage unit, etc.) is arranged. The infusion needle structure, arranged on the housing 100, is used to set the infusion needle 130, making the drug flow from the drug storage unit to the skin. Preferably, in the embodiment of the present invention, the infusion needle structure is arranged in the middle position of the infusion device, so that the internal structure of the infusion device can be optimized, reducing the volume size of the infusion device.

The infusion needle structure includes a needle holder 120 and an infusion needle 130. The infusion needle 130, arranged on the needle holder 120, includes a front end 130a and a back end 130b both of which extend out of the needle holder 120, as shown in FIG. 1b. The front end 130a is used to communicate with the drug storage unit while the back end 130b is used to pierce the skin.

Generally, before the infusion device is attached on the skin surface, the back end 130b of the infusion needle is not exposed outside the housing 100 in order to avoid accidental trauma on the skin. After the infusion device being attached on the skin surface, the back end 130b of the infusion needle can be manipulated to pierce into the skin. Therefore, in the embodiment of the present invention, the needle holder 120 has multiple positions, such as an initial position and a working position. When the needle holder 120 is in the initial position, the front end 130a is not in communication with the drug storage unit, so the drug cannot enter the infusion needle 130, and the back end 130b of the infusion needle is not exposed outside the housing 100. When the needle holder 120 is in the working position, the front end 130a is in communication with the drug storage unit while the back end 130b is pierced under the skin, therefore, the drug can be injected under the skin.

It should be noted that in other embodiments of the present invention, the needle holder 120 may also include three or more different positions, such as an initial position, an intermediate position and a working position. The middle position is used for priming, making the drug exhaust the air in the infusion needle 130 previously.

In order to make the infusion needle 130 work normally, the needle holder 120 is also provided with an auxiliary fastener 122 for fixing the needle holder 120 in a specific position. At the same time, the inside of the drug infusion device is also provided with a fastening portion 150 for cooperating with the auxiliary fastener 122 to lock the needle holder 120, such as, in the working position. The auxiliary fastener 122 or the fastening portion 150 includes a fastening hole, a fastening block, a fastening slot or a fastening hook, and the like, which will be described in detail below.

It should be noted herein that the cooperation between the fastening portion 150 and the auxiliary fastener 122 includes direct or indirectly fastening of the two, which will be described in detail below.

In another embodiment of the present invention, the infusion needle structure further includes a limit component 110 disposed on the housing 100 and used to limit the infusion needle structure in the non-working position, which can prevent the needle holder 120 from falling off from the guide chamber (described in detail below), and prevent the infusion needle from being touched and piercing the skin by mistake.

Please continue to refer to FIG. 1a and FIG. 1b, preferably, in the embodiment of the present invention, the needle holder 120 of the infusion needle structure is further provided with a guide post 121 while the housing 100 is also provided with a guide chamber (not shown). The guide post 121 can move along the guide chamber, making the needle holder 120 reach different positions. Preferably, in the embodiment of the present invention, a locking cantilever 112 is further provided on the limit component 110. Therefore, the limit component 110 cooperates with the convexes or concaves 123, provided on the side surface of the guide post 121, by fastening the locking cantilever 112 to limit the needle holder 120 at the initial position.

It should be noted that, in the embodiment of the present invention, in the operation steps before the needle holder 120 is installed to the working position, the limit component 110 needs to be removed from the housing 100 to eliminate the movement disorders of the needle holder 120. As described below, when the needle holder 120 needs to be released and reset, the limit component 110 can be reused.

The auxiliary fastener 122 may be provided on the guide post 121 or at other positions of the needle holder 120, which will not be specifically limited herein. Preferably, in the embodiment of the present invention, the auxiliary fastener 122 is disposed under the top of the needle holder 120, as shown in FIG. 1b.

A spring 160 is also provided in the guide chamber. After the spring 160 is provided, the needle holder can pop-up and be automatically reset after being released, which optimizes the resetting process and facilitates the user's operation. When the needle holder 120 is in the working position, the spring 160 is compressed and provides resilience to the needle holder 120. Preferably, in the embodiment of the present invention, the spring 160 is covered on the bottom end of the guide post 121. However, due to the fastening portion 150 and the auxiliary fastener 122 are fastened with each other, the resilience of the spring 160 cannot be released. In another embodiment of the present invention, the bottom of the guide post 121 directly contacts and presses the top of the spring 160.

Figure 2:
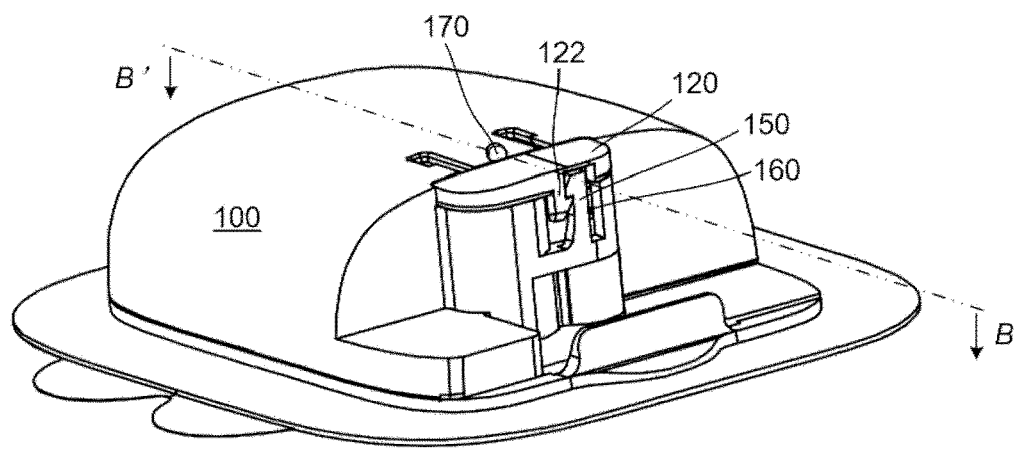
FIG. 2 is a schematic view of a needle holder installed in the working position according to an embodiment of the present invention.

FIG. 2 is a schematic view of the needle holder 120 installed in the working position in the embodiment of the present invention.

As shown in FIG. 2, the auxiliary fastener 122 and the fastening portion 150 are fastened with each other, making the needle holder 120 installed to the working position, therefore, the spring 160 is compressed. At this time, the drug can flow from the drug storage unit into body through the infusion needle 130.

The infusion needle structure of the embodiment of the present invention further includes an unlock hole 170 and an unlock rod 180 (as shown in FIG. 1a). The opening of the unlock hole 170, arranged on the needle holder 120 or on the housing 100, serves as a working channel of the unlock rod 180 to release the needle holder 120. The unlock rod 180 can be inserted into the unlock hole 170. Pushing the unlock rod 180 can release and reset the locked needle holder 120, whose working principle will be described in detail below.

It should to be noted that the unlock rod 180 can be provided in the infusion device, or a separate component attached to the product purchased by the user. Preferably, in the embodiment of the present invention, the unlock rod 180 is disposed on the limit component 110, such as at one end of the limit component 110 (as shown in FIG. 1a). In another embodiment of the present invention, the unlock rod 180 is provided as a separate component in the product of the infusion device.

Figure 3A:
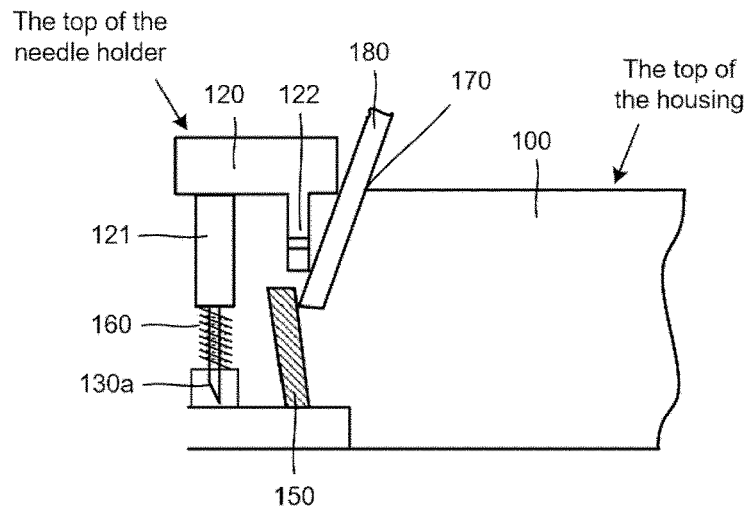
FIG. 3a-FIG. 3c are schematic views of the principle structure of the unlock rod releasing the needle holder according to different embodiments of the present invention.
Figure 3B:
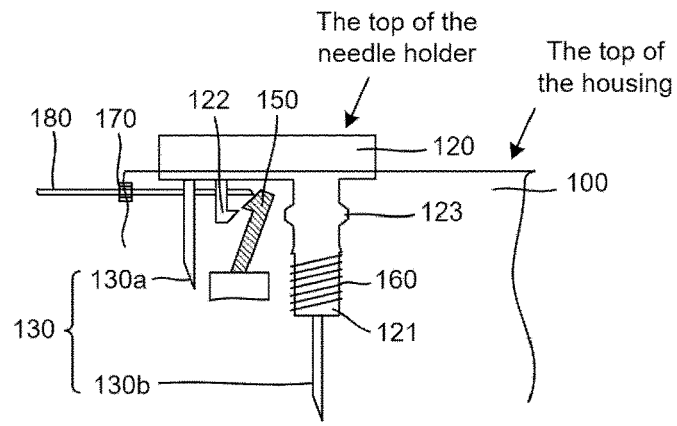
Figure 3C:
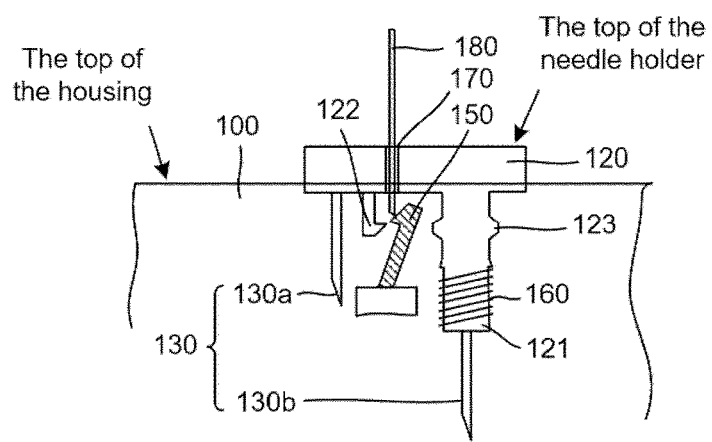

FIG. 3a-FIG. 3c are schematic views of the unlock rod 180 releasing the needle holder 120 in different embodiments of the present invention. FIG. 3a is a schematic view of the infusion needle structure taken along the section line B-B' in FIG. 2.

The mode for forcing to release and reset the needle holder 120 in the embodiment of the present invention includes a pop-up mode, that is, the releasing and resetting process of the needle holder 120 requires the resilient force of the spring 160. The principle of releasing and resetting the needle holder 120 is as follows. The front end of the unlock rod 180, inserted into the unlock hole 170, acts on the fastening portion 150. And then, while pushing the unlock rod 180, the end of the fastening portion 150 is tilted and moves a certain distance, thereby releasing the fastening of the auxiliary fastener 122. Therefore, under the action of the resilience of the spring 160, the needle holder 120 is released and reset from the working position to the initial position, thus, the back end 130b of the infusion needle moves out of the skin, or even retracts into the infusion device.

Obviously, according to the position of the fastening portion 150, the opening of the unlock hole 170 may also be provided on the top or side wall of the housing 100. Preferably, in the embodiment of the present invention, the opening of the unlock hole 170 is provided on the top of the infusion device housing 100.

As shown in FIG. 3b, the opening of the unlock hole (not shown) is provided on the side wall of the housing 100. Similarly, while the unlock rod 180 is being inserted into the unlock hole, the top end of the fastening portion 150 is pushed to move to one side, thereby releasing the fastening of the fastening portion 150 with the auxiliary fastener 122, and also releasing the needle holder 120.

It should be noted that the opening of the unlock hole 170 can also be provided on the top of the needle holder 120. Similarly, pushing the unlock rod 180 into the unlock hole 170 can make the end of the fastening portion 150 move a certain distance, as shown in FIG. 3c.

Figure 4A:
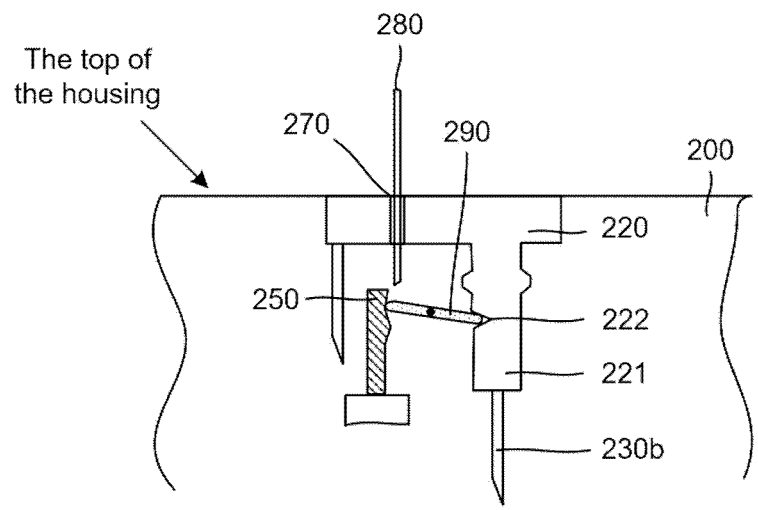
FIG. 4a-FIG. 4b are respectively schematic views before and after the unlock rod releases the needle holder according to another embodiment of the present invention.
Figure 4B:
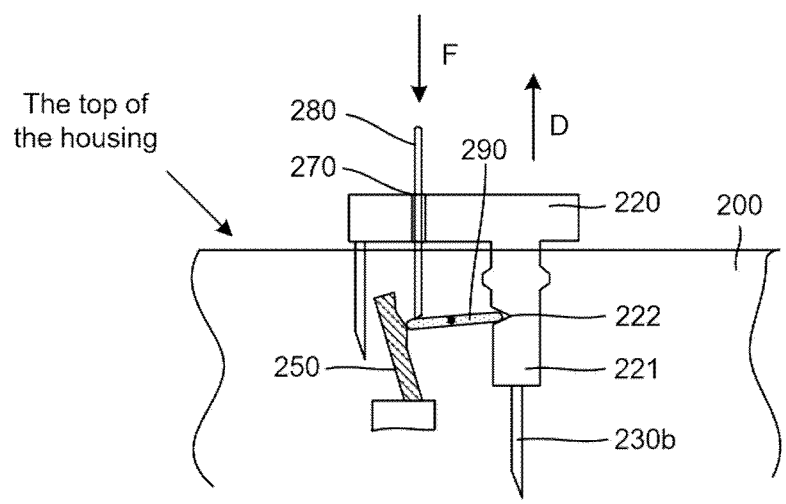

FIG. 4a-FIG. 4b are schematic views of before and after the unlock rod 280 releases and resets the needle holder 220 according to another embodiment of the present invention.

The mode for forcing to release and reset the needle holder 220 also includes a pushing mode, that is, the releasing and resetting process of the needle holder 220 does not rely on the elastic force of the spring, instead by continuously pushing the unlock rod 280.

Preferably, in the embodiment of the present invention, the infusion needle structure further includes a locking lever 290. The fastening portion 250 is a fastening slot while the auxiliary fastener 222 is a fastening hole or a fastening slot provided on side surface of the guide post 221. The fastening portion 250 cooperates with the auxiliary fastener 222 through the locking lever 290 to realize the locking of the needle holder 220, that is, the fastening portion 250 and the auxiliary fastener 222 are indirectly fastened, and the locking lever 290 is used as a transition component. The locking lever 290 includes a first end and a second end, and its fulcrum is set on the housing 200 and between these two ends. The first end of the locking lever 290 is movably arranged inside the auxiliary fastener 222. Since the movable range of the needle holder 220 is limited, the first end of the locking lever 290 is always located inside the auxiliary fastener 222. Before the needle holder 220 is released and reset, the second end of the auxiliary fastener 222 and the fastening portion 250 are fastened with each other to lock the needle holder 220 in the working position, as shown in FIG. 4a.

As shown in FIG. 4b, the principle of releasing and resetting the needle holder 220 by the unlock rod 280 is as follows. After the unlock rod 280 is inserted into the unlock hole 270, pushing the unlock rod 280, the second end of the locking lever 290 is forced, therefore, the end of the fastening portion 250 moves to its one side due to the force received from the second end of the locking lever 290, thus, making the locking lever 290 unlocked, and making the needle holder 220 reset and released. Obviously, because there is no spring inside the infusion device, the user needs to continue to push the unlock rod 280. Using the principle of leverage (the arrows in FIG. 4b indicate the direction of the force F and the releasing and the resetting direction D of the needle holder 220, respectively), the user releases and resets the needle holder, which makes the back end 230b of the infusion needle remove out of the skin.

In order to facilitate the user to apply a small force on the unlock rod 280 to reset the needle holder 220, preferably, in the embodiment of the present invention, the opening of the unlock hole 270 is provided on the top of the needle holder 220, and the longitudinal directions of the unlock hole 270 and the guide post 221 are parallel to each other.

It should be noted that, in another embodiment of the present invention, a spring may also be provided inside the infusion device. At this time, the user only just needs to release the second end of the locking lever 290 without continuously pushing the unlock rod 280. Therefore, under the action of the spring's resilience, the needle holder 220 can be release and reset, which is similar with the foregoing.

In summary, the present invention discloses an infusion needle structure of a drug infusion device. When the infusion device is replaced, using the unlock rod and the unlock hole, the user releases and resets the needle holder arranged in the middle position of the infusion device prior to tear the tape pasted on the skin surface, thereby removing the subcutaneous end of the infusion needle from the skin, and avoiding the skin trauma caused by the exposed portion of the infusion needle during the replacement, which enhances the user experience.

The invention claimed is:

1. An infusion needle structure of a drug infusion device, comprising:
   an infusion needle comprising a front end and a back end;
   a needle holder provided with at least one auxiliary fastener, wherein the infusion needle is arranged on the needle holder, when the needle holder is in a working position, the back end is pierced into a skin while the front end is connected with a drug storage unit;
   a fastening portion, arranged inside the infusion device, cooperates with the auxiliary fastener to lock the needle holder in the working position;
   an unlock hole provided on the needle holder or on a housing of the infusion device; and
   an unlock rod inserted into the unlock hole and pushed, thus releasing and resetting the needle holder.

2. An infusion needle structure of a drug infusion device of claim 1, wherein the needle holder includes a guide post which moves along a guide chamber that is provided in the housing.

3. An infusion needle structure of a drug infusion device of claim 2, wherein the auxiliary fastener is arranged on the guide post or under a top of the needle holder, and the auxiliary fastener or the fastening portion includes a fastening hole, a fastening block, a fastening slot, or a fastening hook.

4. An infusion needle structure of a drug infusion device of claim 3, wherein a mode for forcing to release and reset the needle holder includes a pop-up mode or a pushing mode.

5. An infusion needle structure of a drug infusion device of claim 4, further comprising a spring, arranged in the guide chamber, which is compressed by the needle holder when the needle holder is in the working position.

6. An infusion needle structure of a drug infusion device of claim 5, wherein the fastening portion and the auxiliary fastener are fastened with each other directly, when being unlocked, an end of the fastening portion is pushed by the unlock rod to move a distance to release the auxiliary fastener fastened by the fastening portion, and the spring exerts a resilient force toward the needle holder.

7. An infusion needle structure of a drug infusion device of claim 4, further comprising a locking lever, the auxiliary fastener is a fastening hole or a fastening slot, a first end of the locking lever is movably arranged inside the auxiliary fastener while a second end of the locking lever is fastened by the fastening portion, a fulcrum of the locking lever is arranged between the first end and the second end of the locking lever, and the second end is pushed by the unlock rod to move a distance to release the locking lever and the needle holder.

8. An infusion needle structure of a drug infusion device of claim 2, further comprising a limit component, arranged on the housing, which is used to limit a position of the needle holder when the needle holder is in a non-working position.

9. An infusion needle structure of a drug infusion device of claim 8, wherein the unlock rod is arranged on the limit component.

10. An infusion needle structure of a drug infusion device of claim 8, wherein a side surface of the guide post is provided with convex or concave while the limit component is provided with a fastening cantilever which is used to cooperate with the convex or concave to limit the position of the needle holder.

11. An infusion needle structure of a drug infusion device of claim 2, wherein an opening of the unlock hole is provided on a top of the needle holder or the housing, or on a side wall of the housing.

12. An infusion needle structure of a drug infusion device of claim 11, wherein the opening of the unlock hole is provided on the top of the needle holder, and longitudinal directions of the unlock hole and the guide post are parallel to each other.

* * * * *